United States Patent [19]
Hakoun et al.

[11] Patent Number: 5,382,276
[45] Date of Patent: Jan. 17, 1995

[54] METHOD AND APPARATUSES FOR CUTTING A RIBBON OF AN OPTICAL FIBERS OBLIQUELY

[75] Inventors: Roland Hakoun, Domont; Michel Reslinger, Bondoufle, both of France

[73] Assignee: Mars Actel, Vrigne Aux Bois, France

[21] Appl. No.: 93,714

[22] Filed: Jul. 20, 1993

[30] Foreign Application Priority Data

Jul. 24, 1992 [FR] France ............................ 92 09170

[51] Int. Cl.⁶ .................................... C03B 37/023
[52] U.S. Cl. ............................. 65/433; 65/536; 65/501
[58] Field of Search .............. 65/64.2, 4.21, 11.2

[56] References Cited

U.S. PATENT DOCUMENTS

| 4,715,876 | 12/1987 | Osaka et al. | 65/4.21 |
| 4,893,892 | 1/1990 | Ziemek et al. | 65/4.2 |

FOREIGN PATENT DOCUMENTS

| 0287474 | 10/1988 | European Pat. Off. | 65/10.2 |
| 2646521 | 11/1990 | France . | |
| 0455141A1 | 11/1991 | France . | |
| 55-144444 | 11/1980 | Japan . | |
| 60-48001 | 10/1985 | Japan | 65/10.2 |
| 2147577 | 5/1985 | United Kingdom | 65/10.2 |
| 0912690 | 3/1982 | U.S.S.R. | 65/10.2 |
| WO9003338 | 4/1990 | WIPO . | |

Primary Examiner—Robert L. Lindsay
Attorney, Agent, or Firm—Sughrue, Mion, Zinn, Macpeak & Seas

[57] ABSTRACT

A method of cutting an optical fiber ribbon obliquely, the ribbon being constituted by a plurality of optical fibers that are all parallel to a "longitudinal" axis of the ribbon, the fibers all being situated in the same horizontal plane referred to as the plane of the ribbon, and being protected by a common sheath, the method comprising the following steps:

a portion of the ribbon is stripped of its sheath;

the ribbon is held stationary at two points situated on either side of the stripped portion;

a curved anvil is advanced along a displacement axis orthogonal to the horizontal plane so as to tension the portion in such a manner as to incline a part of the stripped portion relative to the horizontal plane; and a cutter is advanced facing the anvil and along a displacement axis parallel or coinciding with that of the anvil to cut the stripped portion in the inclined part.

5 Claims, 1 Drawing Sheet

METHOD AND APPARATUSES FOR CUTTING A RIBBON OF AN OPTICAL FIBERS OBLIQUELY

The present invention relates to a method of cutting an optical fiber ribbon obliquely so that the cleaved faces of the fibers in the ribbon all lie in a common section plane that is not perpendicular to the longitudinal axis of the ribbon.

BACKGROUND OF THE INVENTION

To connect one optical fiber ribbon to another, it is necessary to prepare the ends of the fibers making up the ribbon so as to obtain optimum operation of the resulting optical link. Conventionally, the ends of the fibers in the ribbon are cut so that their faces to be connected all lie in the same plane orthogonal to their longitudinal axes.

When the ribbons to be connected are placed end to end, with the plane faces to be connected of the optical fibers brought into coincidence, very large amounts of reflection may take place at the interfaces, thereby running the risk of degrading the transmission characteristics of the resulting links.

To mitigate this drawback, when connecting single optical fibers, it is known that the end of the fiber may be caused to have a plane surface that is not perpendicular to the axis of the fiber, with the normal to said surface making an angle of 5°, for example, relative to the axis of the fiber. A systematic departure from prior practice is thus created that makes it possible to eliminate parasitic reflections.

Japanese patent application JP-57 24903 describes a method of cutting an optical fiber obliquely, the method consisting in fixing the fiber at two points by means of two clamps, in twisting it about its longitudinal axis, in starting a break by means of a diamond cutter, and then tensioning the fiber while pressing a curved anvil against it until the fiber cleaves. A section plane is then obtained at an angle of inclination that is a function of the torque and of the tension force applied to the fiber.

Such a method cannot be used with a ribbon made up of a plurality of optical fibers disposed parallel to one another in a common protective sheath. It will readily be understood that it is not possible to apply an identical torque to each of the fibers in the ribbon about their respective longitudinal axes. Thus, the section obtained using such a method when applied to a ribbon of optical fibers is not satisfactory: the end faces of the cleaved fibers do not all lie in the same inclined plane.

OBJECT AND SUMMARY OF THE INVENTION

The object of the present invention is therefore to provide a method for cutting a ribbon of optical fibers obliquely in such a manner that all of the cleaved ends of the fibers in the ribbon lie in a common plane that is not perpendicular to the longitudinal axis of the ribbon.

To this end, the present invention provides a method of cutting an optical fiber ribbon obliquely, the ribbon being constituted by a plurality of optical fibers that are all parallel to a "longitudinal" axis of said ribbon, the fibers all being situated in the same horizontal plane referred to as the plane of said ribbon, and being protected by a common sheath, the method comprising the following steps:

a portion of said ribbon is stripped of its sheath;

said ribbon is held stationary at two points situated on either side of said stripped portion;

a curved anvil is advanced along a displacement axis orthogonal to said horizontal plane so as to tension said portion in such a manner as to incline a part of said stripped portion relative to said horizontal plane; and a cutter is advanced facing said anvil and along a displacement axis parallel or coinciding with that of said anvil to cut said stripped portion in said inclined part.

Advantageously, in a first variant, said ribbon is held at two points situated on either side of said stripped portion so that said stripped portion lies in a plane that is inclined relative to the plane of said ribbon.

In another possible variant, the displacement axis of said cutter is parallel to the displacement axis of said anvil and distinct therefrom.

In the method of the invention, the ribbon is cut at a portion thereof that is inclined so as to obtain cleavage that is oblique. The inclination is obtained either by offsetting the holding points relative to the plane of the ribbon or else by advancing the anvil and the cutter along distinct axes so as to cut the ribbon against a flank of the anvil and not on its axis of symmetry, i.e. at a point where the ribbon is inclined.

By the method of the invention, all of the fibers in the ribbon are in the same state at the moment of cutting and they are cut so that their end faces all lie in the same inclined plane. Naturally, the inclination of that plane is a function of the inclination of the ribbon relative to the cutter.

One possible apparatus for implementing the method of the invention comprises:

two supports situated at a distance apart from each other, and each possessing a plane surface that includes a groove, said plane surfaces occupying planes that are mutually parallel and distinct so that once said ribbon is inserted in both of said grooves, said stripped portion extends between said two supports and is inclined relative to the planes thereof;

two jaws co-operating with respective ones of said two supports and designed to hold said ribbon in each of said supports;

a curved anvil situated between said two supports;

a cutter situated between said two supports, said anvil and said cutter being on opposite sides of said plane of said ribbon;

means for advancing said anvil along a displacement axis orthogonal to the planes of said two supports and for pressing it against said stripped portion so as to tension said stripped portion between said two supports; and means for advancing said cutter along a displacement axis orthogonal to the planes of said two supports and for applying it against said stripped portion over said anvil in order to cut the stripped portion.

Another possible apparatus for implementing the method of the invention comprises:

two supports situated at a distance apart from each other, and each possessing a plane surface that includes a groove for receiving said ribbon so that said stripped portion lies between said two supports;

two jaws co-operating with respective ones of said two supports and designed to hold said ribbon in each of said supports;

a curved anvil situated between said two supports;

a cutter situated between said two supports, said anvil and said cutter being on opposite sides of said plane of said ribbon;

means for advancing said anvil along a displacement axis orthogonal to the planes of said two supports and for pressing it against said stripped portion so as to tension said stripped portion between said two supports; and means for advancing said cutter along a displacement axis orthogonal to the planes of said two supports and distinct from the displacement axis of said anvil, and for applying it against said stripped portion over said anvil in order to cut the stripped portion.

BRIEF DESCRIPTION OF THE DRAWINGS

Other characteristics and advantages of the present invention appear from the following description of apparatuses of the invention given as non-limiting examples.

In the accompanying figures.

MORE DETAILED DESCRIPTION

Figure 1:
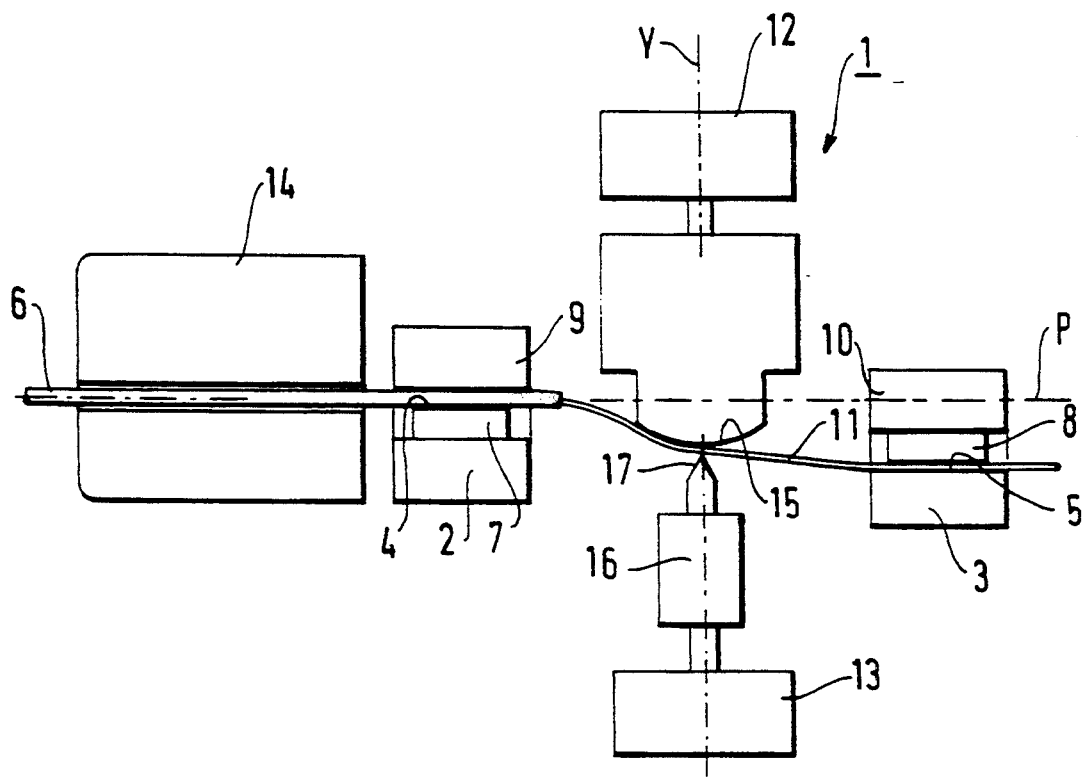
FIG. 1 is a diagram of a first apparatus of the invention.

In the figures, items that are common to both figures are given the same reference numerals.

FIG. 1 shows an apparatus 1 of the invention. The apparatus 1 comprises two identical plane supports 2 and 3. A piece 7 in the form of a rectangular parallelepiped is placed on the support 2 and has a groove 4 in its surface. An optical fiber ribbon 6 carried by a mandrel 14 and having a stripped portion 11 has a non-stripped portion thereof inserted in the groove 4 of the support 2. To hold the ribbon 6 in the support 2, a jaw 9 that is movable about a hinge (not shown) whose axis is parallel to the groove 4 is closed against the support 2.

The support 3 which is at a distance from the support 2 has a groove 5 in its surface. The stripped portion 11 projecting beyond the support 2 is inserted in the groove 5 so that the portion 11 extends between the supports 2 and 3. To hold it in place, use is made of another jaw 10 movable about a hinge (not shown) whose axis is parallel to the groove 5, with the jaw serving to clamp the portion 11 via another piece 8 in the form of a rectangular parallelepiped.

The surfaces of the piece 7 and of the support 3 occupy respective horizontal planes. These two planes are parallel but different so that the portion 11 is inclined relative to the non-stripped portion of the ribbon 6 as held by the mandrel 14, which remains horizontal and lies in a plane P orthogonal to the plane of FIG. 1 with its trace being shown in the figure.

The mandrel 14 may be removable and it may be secured to the apparatus 1, e.g. by engaging studs (not shown).

The apparatus 1 also includes a curved anvil 15 situated about halfway between the supports 2 and 3. Under drive from an appropriate device 12, the anvil 15 is capable of performing translation movements parallel to a displacement axis Y that is orthogonal to the plane P. By moving in translation along the axis Y, the anvil 15 is pressed against the portion 11, thereby serving to put it under tension.

Finally, the apparatus 1 includes a diamond cutter 16 situated between the supports 2 and 3 on the opposite side of the portion 11 and facing the anvil 15. The diamond cutter 16 is also driven by an appropriate device 13 in translation motion along the axis Y so as to nick the portion 11 over the anvil 15 when the portion 11 has been put under tension by the anvil. The blade 17 of the diamond cutter 16 extends orthogonally to the axis Y and the plane of FIG. 1, and it is secured to a spring (not shown) enabling a pressure that is constant and controlled to be applied to the ribbon to be cleaved, thereby making sectioning more accurate.

To cut the optical fiber ribbon obliquely by means of the apparatus of FIG. 1, the first step is to strip the end of the ribbon 6 and then to install it in the ribbon-receiving grooves 4 and 5 so that the stripped portion 11 extends between the supports 2 and 3.

Once the jaws 12 and 13 are closed, the anvil 15 is moved along the axis Y towards the cutter 16 so as to press the anvil against the portion 11, thereby putting it under tension, after which the fibers are cut by means of the cutter 16 which is displaced in turn along the axis Y towards the anvil 15. Thereafter the portion of the ribbon 6 that is to be conserved can be removed by opening the jaws 12 and 13.

The accuracy of the resulting cut is ±1°. In addition, the cut that is performed is easily reproducible.

In practice, the fibers of the ribbon 6 are cut by the cutter 16 before being pressed against the anvil 15. An oblique cut is obtained since the portion 11 is inclined relative to the blade 17 of the cutter 16.

Figure 2:
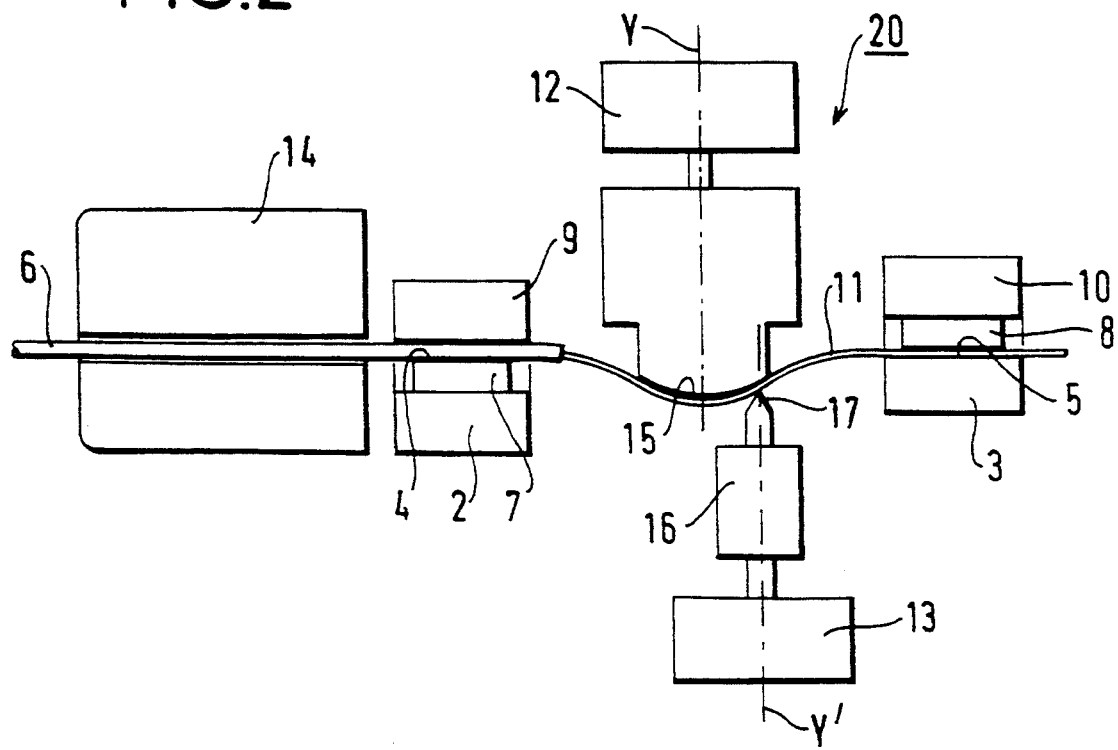
FIG. 2 is a diagram of a second apparatus of the invention.

FIG. 2 shows another possible apparatus using the principle of the present invention, and given overall reference 20.

The main difference between the apparatus 1 and the apparatus 20 lies in the fact that the anvil 15 and the cutter 16 no longer move along a common axis Y, but along distinct displacement axes respectively referenced Y and Y'. The axes Y and Y' are parallel to each other and they are offset by a distance such that the cutter 16 is still always facing the anvil 15. Under such circumstances, there is no longer any need to place the ribbon-receiving grooves in two distinct planes since the ribbon is cut while it is pressed against a portion of the anvil that is inclined relative to the blade 17.

The inclination is thus obtained because of the offset between the displacement axes Y and Y'.

To cut an optical fiber ribbon obliquely by means of the apparatus 20, the first step is to strip the end of the ribbon 6 and then to install it in the ribbon-receiving grooves 4 and 5 so that the stripped portion 11 lies between the supports 2 and 3.

Once the jaws 12 and 13 have been closed, the anvil 15 is displaced along the axis Y towards the cutter 16 so as to press against the portion 11, thereby putting the portion 11 under tension, after which the fibers are cut by displacing the cutter 16 along the axis Y' towards the anvil 15. Thereafter, the portion of the ribbon 6 that is to be conserved can be removed by opening the jaws 12 and 13.

The apparatus 20 gives the same results as the apparatus 1 with respect to quality and accuracy of the cut performed. It also presents the same advantages as the apparatus 1.

Naturally, the invention is not limited to the embodiments described above.

In particular, in the apparatus 20, it is possible to place the ribbon-receiving grooves in different planes, as shown in FIG. 1.

It is also possible, in the apparatus of FIG. 1, to separate the displacement axes of the anvil and of the cutter, while taking care to ensure that the cutter always faces the anvil.

Finally, any means may be replaced by equivalent means without going beyond the scope of the invention.

We claim:

1. A method of cutting an optical fiber ribbon obliquely, the ribbon being constituted by a plurality of optical fibers that are all parallel to a "longitudinal" axis of said ribbon, the fibers all being situated in the same horizontal plane referred to as the plane of said ribbon, and being protected by a common sheath, the method comprising the following steps:

stripping a portion of said ribbon of its sheath;

holding said ribbon stationary at two points situated on either side of said stripped portion;

advancing a curved anvil along a displacement axis orthogonal to said horizontal plane into contact with said portion and tensioning said portion while inclining a part of said stripped portion relative to said horizontal plane; and advancing a cutter facing said anvil along a displacement axis parallel to or coinciding with that of said anvil to cut said stripped portion at said inclined part.

2. A method according to claim 1, wherein said step of holding said ribbon stationary at two points situated on either side of said stripped portion comprises causing said stripped portion to lie in a plane that is inclined relative to the plane of said ribbon.

3. A method according claim 1, wherein said step of advancing said curved anvil comprises advancing said cutter along a displacement axis parallel to the displacement axis of said anvil and distinct therefrom.

4. Apparatus for cutting an optical fiber ribbon obliquely, the ribbon being constituted by a plurality of optical fibers that are all parallel to a "longitudinal" axis of said ribbon, the fibers all being situated in the same horizontal plane referred to as the plane of said ribbons and being protected by a common sheath, said apparatus comprising:

two supports situated at a distance apart from each other, and each possessing a plane surface that includes a groove, said plane surfaces occupying planes that are mutually parallel and distinct so that once said ribbon is inserted in both of said grooves, said stripped portion therebetween extends between said supports and is inclined relative to the planes thereof;

two jaws co-operating respectively with ones of said two supports and designed to hold said ribbon on opposite sides of said stripped portion respectively in said supports;

a curved anvil situated between said two supports;

a cutter situated between said two supports, said anvil and said cutter being on opposite sides of said plane of said ribbon;

means for advancing said anvil along a displacement axis orthogonal to the planes of said two supports and for pressing said anvil against said stripped portion so as to tension said stripped portion between said two supports; and means for advancing said cutter along a displacement axis orthogonal to the planes of said two supports and for applying it against said stripped portion over said anvil in order to cut said stripped portion.

5. Apparatus for cutting an optical fiber ribbon obliquely, the ribbon being constituted by a plurality of optical fibers that are all parallel to a "longitudinal" axis of said ribbon, the fibers all being situated in the same horizontal plane referred to as the plane of said ribbon, and being protected by a common sheath, said apparatus comprising:

two supports situated at a distance apart from each other, and each possessing a plane surface that includes a groove for receiving said ribbon so that a stripped portion of said ribbon lies between said two supports;

two jaws co-operating with respective ones of said two supports for holding said ribbon to opposite sides of said stripped portion in respective supports;

a curved anvil situated between said two supports;

a cutter situated between said two supports, said anvil and said cutter being on opposite sides of said plane of said ribbon;

means for advancing said anvil along a displacement axis orthogonal to the planes of said two supports and for pressing said anvil against said stripped portion so as to tension said stripped portion between said two supports; and means for advancing said cutter along a displacement axis orthogonal to the planes of said two supports and distinct from a parallel displacement axis of said anvil, and for applying it against said stripped portion over said anvil to cut said stripped portion of said optical fiber ribbon obliquely.

* * * * *